(12) United States Patent
Burgart et al.

(10) Patent No.: US 7,310,943 B2
(45) Date of Patent: Dec. 25, 2007

(54) HYDROSTATIC TRANSMISSION CONTROLS WITH ALTERNATIVE OPERATING MODES

(75) Inventors: Joseph Gerard Burgart, Des Moines, IA (US); Mark David Evans, Grovetown, GA (US)

(73) Assignee: Deere & Company, Moline, IL (US)

( * ) Notice: Subject to any disclaimer, the term of this patent is extended or adjusted under 35 U.S.C. 154(b) by 181 days.

(21) Appl. No.: 11/297,966

(22) Filed: Dec. 9, 2005

(65) Prior Publication Data

US 2007/0130931 A1 Jun. 14, 2007

(51) Int. Cl.
*F16D 31/02* (2006.01)

(52) U.S. Cl. .............................. 60/433; 60/328; 60/487

(58) Field of Classification Search ................. 60/328, 60/422, 433, 487
See application file for complete search history.

(56) References Cited

U.S. PATENT DOCUMENTS

| | | | | |
|---|---|---|---|---|
| 3,579,988 A | * | 5/1971 | Firth et al. ...................... | 60/486 |
| 3,927,528 A | | 12/1975 | Van Der Kolk et al. ....... | 60/431 |
| 3,969,896 A | | 7/1976 | Louis .......................... | 60/431 |
| 4,191,270 A | * | 3/1980 | Monteith ....................... | 60/449 |
| 4,546,664 A | * | 10/1985 | Mylander ..................... | 60/427 |
| 4,594,666 A | | 6/1986 | Cornell ..................... | 364/424.1 |
| 4,648,040 A | | 3/1987 | Cornell et al. ............ | 364/424.1 |
| 6,022,292 A | | 2/2000 | Goodnight .................. | 477/121 |
| 6,247,378 B1 | * | 6/2001 | Newendorp et al. ..... | 74/473.12 |
| 6,298,939 B1 | | 10/2001 | Heindl et al. ............... | 180/336 |
| 6,381,529 B1 | | 4/2002 | Mistry ......................... | 701/51 |
| 6,470,771 B2 | * | 10/2002 | Nanri et al. .............. | 74/733.1 |
| 6,655,233 B2 | | 12/2003 | Evans et al. .............. | 74/731.1 |

OTHER PUBLICATIONS

Deere Manual for 7220, 7320, 7420, and 7520 Tractors: Revolutionary John Deere Infinitely Variable Transmission (IVT) for Better Operator Control and Increased Productivity, Oct. 4, 2002, [online], [retrieved on Oct. 30, 2002]. Retrieved from the Internet: <URL: http://products.deere.com/Deere/agsales/asm/s2/7020/7020st16. htm>.

Deere Manual for 450H/550H Crawler Dozers: FNR with Transmission Speed In Grip-If Equipped, 2001, [online], [retrieved on Oct. 30, 2002]. Retrieved from the Internet: <URL: http://manuals. deere.com/omview/OMT179658_19/html>.

(Continued)

*Primary Examiner*—Michael Leslie

(57) ABSTRACT

A hydrostatic transmission on a tractor is operated by a microcontroller providing current commands to the hydrostatic transmission pump, and manual controls that provide signals to the microcontroller so the current commands cause the hydrostatic transmission to operate in either a first mode or a second mode. In the first or automatic mode the swash plate position may be continuously variable based on the position of a foot pedal. In the second or gear mode the swash plate may be moved to any of a plurality of discrete positions based on the position of a manually operable switch.

20 Claims, 8 Drawing Sheets

OTHER PUBLICATIONS

Deere Manual for 450H/550H Crawler Dozers: Foot Pedals, 2001, [online], [retrieved on Oct. 30, 2002]. Retrieved from the Internet: <URL: http://manuals.deere.com/omview/OMT179658_19/html>.

Deere Manual for 304H Loader: Shifting the Machine, 2001, [online], [retrieved on Oct. 30, 2002]. Retrieved from the Internet: <URL: http://manuals.deere.com/omview/OMT184550_19/html>.

Deere Manual for 450H/550H Crawler Dozers: Forward-Neutral-Reverse Control Lever (FNR), 2001, [online], [retrieved on Oct. 30, 2002]. Retrieved from the Internet: <URL: http://manuals.deere.com/omview/OMT179658_19/html>.

Deere Manual for 304H Loader: Brake/Inching Pedal, 2001, [online], [retrieved on Oct. 30, 2002]. Retrieved from the Internet: <URL: http://manuals.deere.com/omview/OMT184550_19/html>.

Deere Specifications for 304H, 324H, and 344H Loaders (2002).

Deere Manual for 6000 Series Tractor, p. 45-18, Feb. 2002.

* cited by examiner

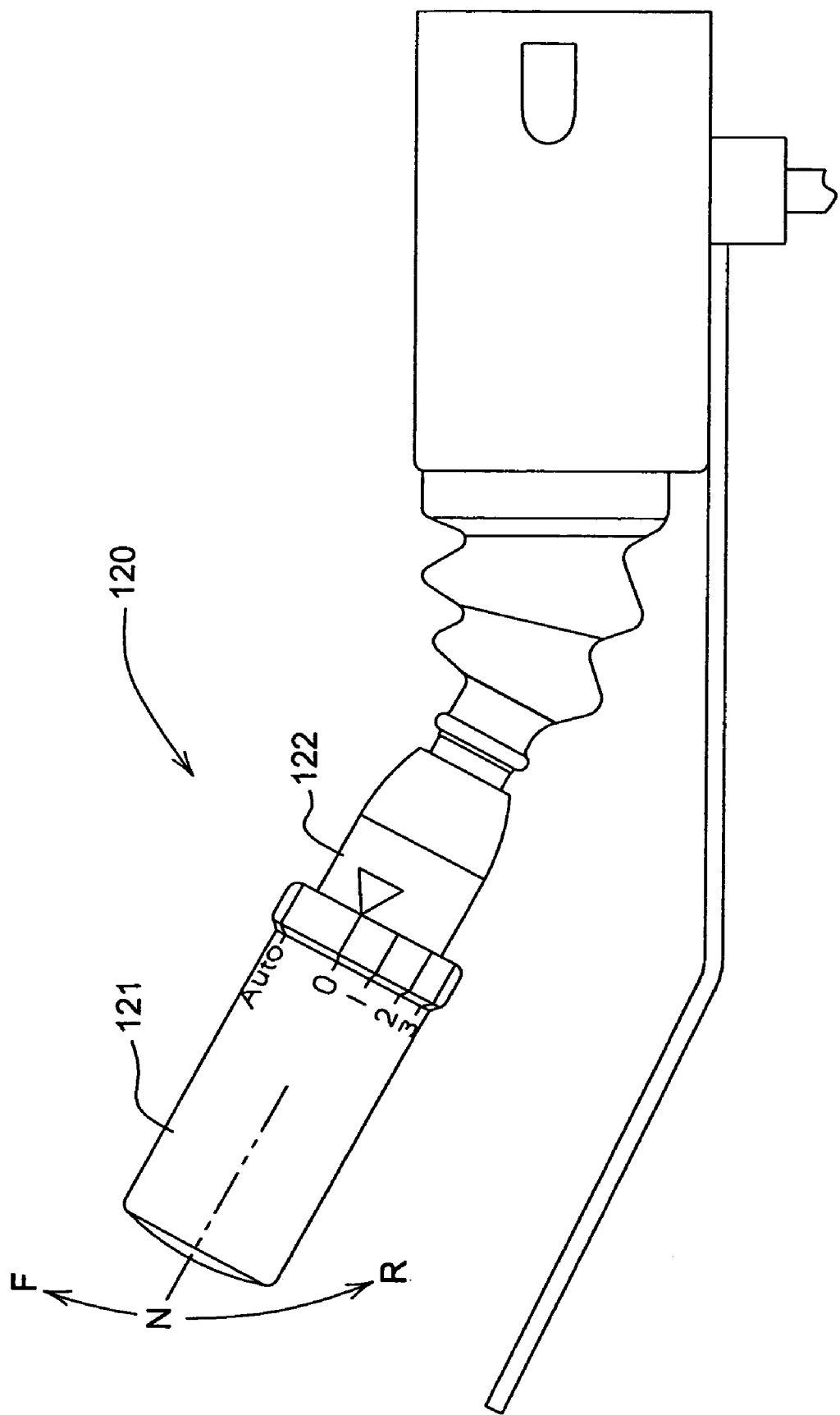

HYDROSTATIC TRANSMISSION CONTROLS WITH ALTERNATIVE OPERATING MODES

FIELD OF THE INVENTION

This invention relates to controls for operating hydrostatic transmissions in tractors and utility vehicles for agriculture, lawn care or recreational use.

BACKGROUND OF THE INVENTION

Tractors and utility vehicles used for agriculture, lawn care or recreational use may have a hydrostatic transmission that drives a final drive transmission or range transmission of the vehicle. The final drive transmission or range transmission may drive at least one wheel. The vehicle speed may be operator modulated by changing the drive ratio of the hydrostatic transmission, as well as the range gears. The drive ratio may be changed by moving the angle of a swashplate of a variable displacement pump of the hydrostatic transmission.

Hydrostatic transmissions in tractors and utility vehicles may be operated using foot pedals to control the direction and speed of the vehicle. For example, a first foot pedal may pivot a swash plate in the hydraulic pump to an angular alignment in which hydraulic fluid provided to the hydraulic motors propels the vehicle forward, and a second foot pedal may pivot the swash plate to move the vehicle in reverse. If neither foot pedal is applied, the swash plate may be in a neutral position.

Advantages of hydrostatic transmissions include infinite speed control for a given engine speed, powered creep, and anti-stall control. It is highly desirable for a tractor or utility vehicle to have these operational features that are available in hydrostatic transmissions. However, some operators are not accustomed to hydrostatic transmission controls, and/or prefer using a gear shift to control travel of the tractor or utility vehicle, and others would prefer using only an accelerator pedal like an automatic transmission. A control apparatus is needed for a hydrostatic transmission that can simulate a gear shift, or automatic transmission, to control movement of the tractor or utility vehicle. A transmission control is needed for a hydrostatic transmission that will enable operators to select between different modes of operation.

Additionally, manufacturing costs are higher for tractors or utility vehicles that are produced with several different transmissions available. A transmission control is needed for a hydrostatic transmission that can reduce manufacturing costs by allowing a single transmission to simulate more than one operational mode.

SUMMARY OF THE INVENTION

The invention provides a transmission control for a hydrostatic transmission of a tractor or utility vehicle that includes alternative control interfaces and transmission responses. The transmission control includes a microcontroller to provide an output current to the proportional control valves for a hydrostatic transmission. The microcontroller may function using a different control algorithm for each operational mode.

BRIEF DESCRIPTION OF THE DRAWINGS

FIG. 11 is a perspective view of a switch that may be used to control a hydrostatic transmission according to one embodiment of the invention.

DESCRIPTION OF THE PREFERRED EMBODIMENT

Figure 1:
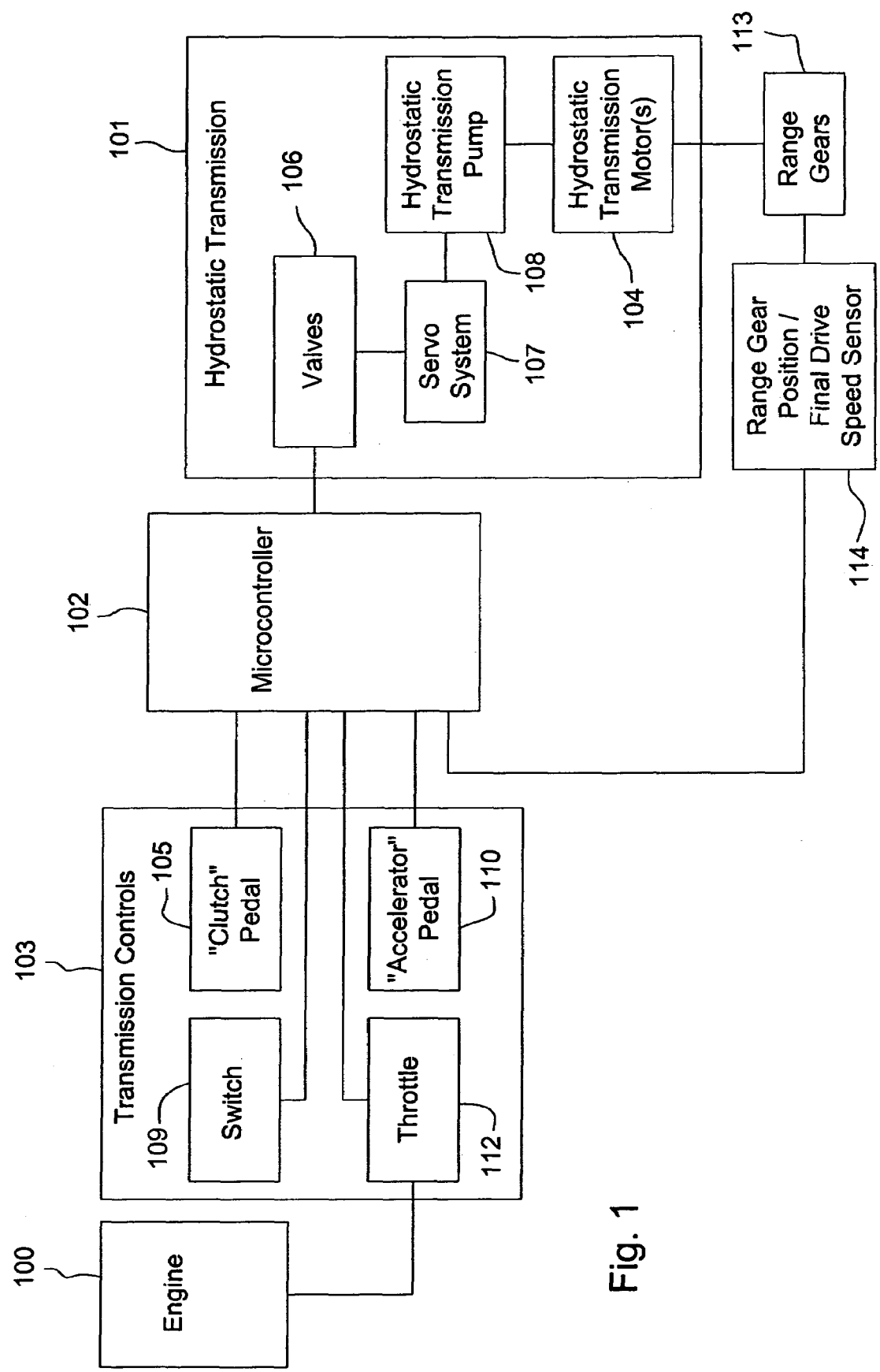
FIG. 1 is a block diagram showing a system in which the transmission controls function in a first embodiment of the invention.

As shown in the block diagram of FIG. 1, in one embodiment, a tractor or utility vehicle may include engine 100, hydrostatic transmission 101, microcontroller 102, and transmission controls 103. Engine 100 may be an internal combustion engine, fuel cell, electric or other power supply that may be used in tractors or utility vehicles.

In one embodiment, hydrostatic transmission 101 may include a variable displacement pump 108 providing variable volume flow rate of pressurized hydraulic fluid. Pump 108 may have an angularly adjustable swashplate, and the pump displacement may be set by the angle of the swashplate. At least one proportional control valve 106 may be operated by servo controls 107 connected to the swashplate, the control valve(s) being signal-connected to the coil current output of microcontroller 102. Hydraulic motors 104 may receive the pressurized hydraulic fluid from pump 108. The hydraulic motors may be operatively connected to the rotating part of a drive train, preferably a gear or set of range gears 113.

In one embodiment, microcontroller 102 may be linked electronically to transmission controls 103 and may provide a current output to hydrostatic transmission 101 in one or more operational modes.

In one embodiment, transmission controls 103 may be used in one or more operational modes to operate the hydrostatic transmission or HST. A first operational mode of transmission controls 103 may enable the hydrostatic transmission to simulate an automatic transmission. The first mode also may be referred to as the "automatic" mode. To place the transmission controls in the first "automatic"

mode, switch 109 may be placed in an "Automatic" position. If a position sensor detects the switch in the "Automatic" position, a specified analog output voltage may be provided to microcontroller 102 enabling the transmission to simulate an automatic transmission.

In one embodiment, a second operational mode of transmission controls 103 may simulate a gear drive transmission. The second operational mode may be referred to as a "gear" mode. To operate the transmission controls in the second "gear" mode, switch 109 may be turned to one of several positions representing and simulating discrete and distinct "gears" or speeds.

In one embodiment, switch 109 may be used to select operation of the hydrostatic transmission in either of the "automatic" or "gear" operational modes. For example, switch 109 may be a rotary switch or lever that may be turned or rotated to shift between different operational modes. Switch 109 may have two or more distinct positions. The position of switch 109 may be sensed and provided as a shift lever sensor analog voltage.

Alternatively, switch 109 may be a shift lever with a non-rotary shift configuration. For example, switch 109 may be a shift lever that can be moved in a linear pattern or other pattern to each of several positions. Alternatively, switch 109 may include push button controls to shift between modes or within modes.

In one embodiment as shown in FIG. 11, switch 109 may be a shift lever 120 having a rotary knob 121 that may be rotated about an axis through its center to command speed changes and/or select different modes of operation. For example, the knob may be rotated to select either the first "automatic" mode or a specific "gear" within the second "gear" mode. The knob portion 121 may be gripped and turned about its center axis with respect to indexed portion 122. Detents may be included to provide an operator with points of reference and markings may be included to signify command position. For example, the indexed portion of the switch may be visibly marked to indicate the setting; e.g., to show that the knob is set to "automatic, 0, 1, 2, 3, or 4." Command information from the shift lever may be sensed either with an analog electrical device or with electrical switch contacts.

Additionally, in one embodiment, shift lever 120 may be swung through an arc around the base of the lever shaft to a forward drive command position, a neutral position, and a reverse drive command position. The shift lever may be located anywhere in the operator area of the tractor or vehicle. The shift lever may have a discrete position to command forward movement, a discrete position to indicate neutral, and a discrete position to command reverse movement. Detents may be included to provide points of reference and markings may be included to signify command position. The position of the shift lever may be sensed with either an analog electrical device or with electrical switch contacts. The shift lever position may be used by the microcontroller to provide a current command to set the swash plate in the HST to operate the tractor or vehicle in forward, neutral or reverse.

In one embodiment, there may be a distinct step and/or detent between each "gear" or position of switch 109. Alternatively, the switch may provide continuous shifting without distinct steps between each position, or may provide a bump between positions. For example, the switch may provide continuous or infinitely variable speeds without distinct positions or steps. Instead of a rotary switch or shift lever, switch 109 may have push button controls to step up or down between each "gear" or speed, and between the forward, neutral and reverse positions.

Figure 2:
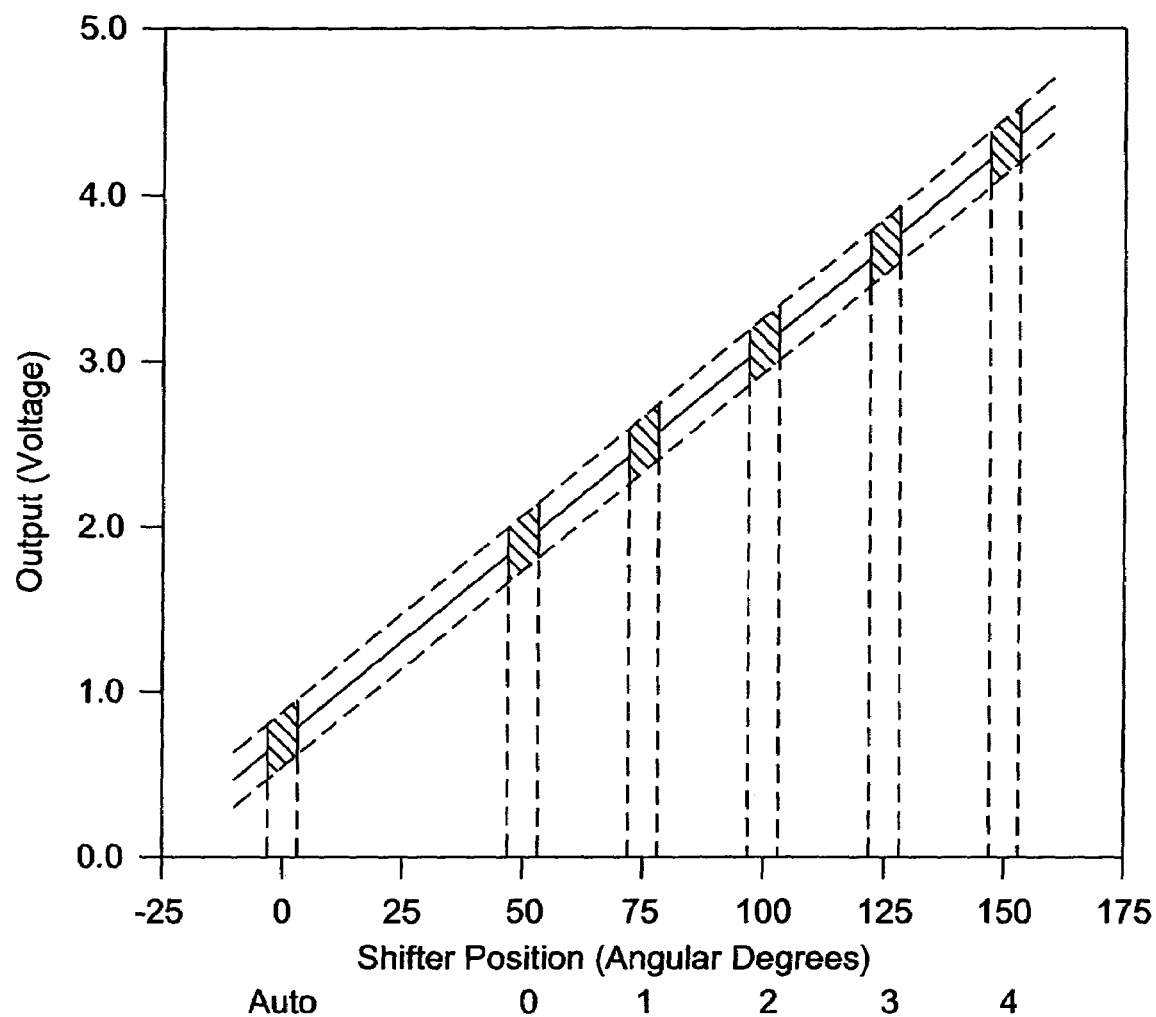
FIG. 2 is a graph of a relationship between the position of a switch, such as a shift lever, and output voltage according to a first embodiment.

The position of the shift lever may be sensed by one or more position sensors to provide an analog rotary position output to the microcontroller. In one embodiment, a variety of different position sensors may be used to determine the position of switch 109 and provide a shift lever sensor voltage. The position sensors include but are not limited to a potentiometer, a hall effect sensor, a pressure transducer, or a series of switches. For example, as shown in FIG. 2, if the shifter position is at an angle of about zero degrees, the analog voltage may be about 0.7 volts (or in a band between about 0.5 and about 0.9 volts) to indicate operation of the transmission controls in the first "automatic" mode.

In one embodiment, if the transmission controls are operated in the first "automatic" mode, the position of "accelerator" pedal 110 may be used to control HST motor speed. In the "auomatic" mode, HST motor speed may be controlled independent of engine speed. The "accelerator" pedal position may be sensed by a position sensor such as a potentiometer, a hall effect sensor, or a pressure transducer. The sensor may provide an analog voltage signal output based on pedal position.

Figure 3:
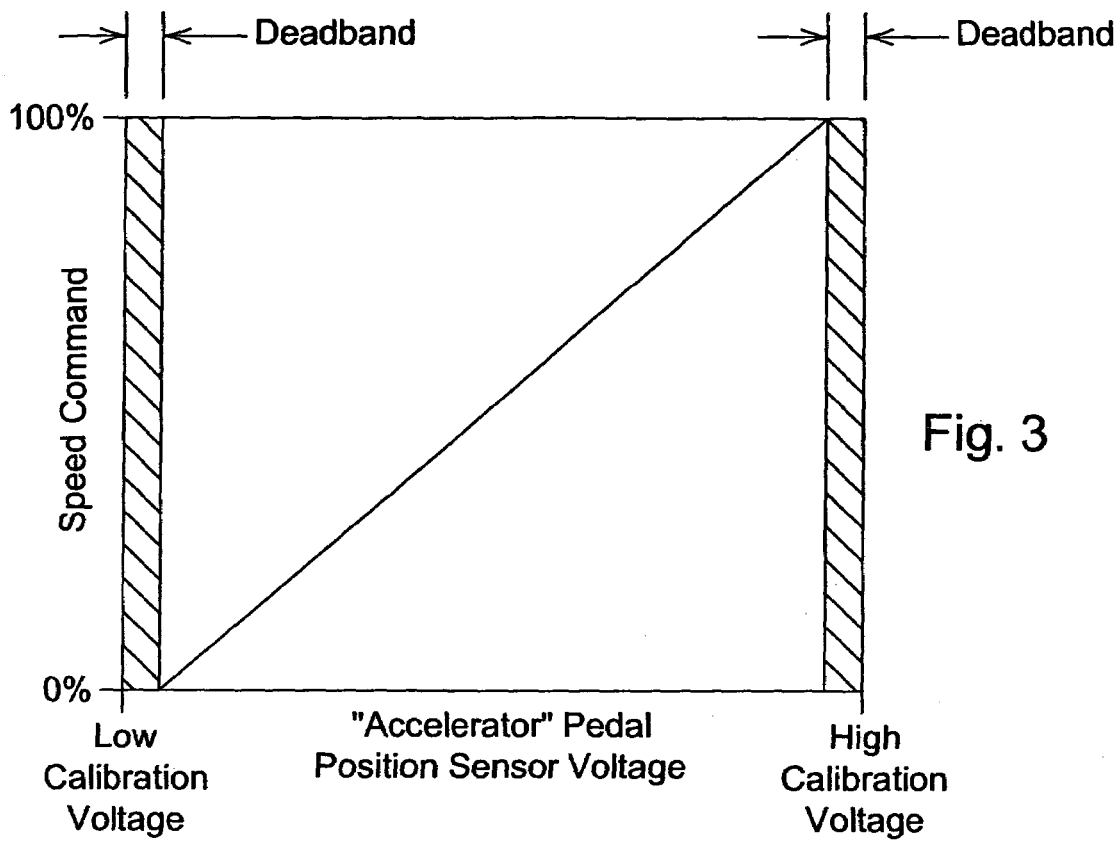
FIG. 3 is a graph of a relationship between the position of an accelerator pedal and speed command in the first "automatic" mode according to a first embodiment.

In one embodiment, in the "automatic" mode, the microcontroller may convert the pedal position sensor voltage to an HST motor speed command between zero and 100%. For example, as shown in FIG. 3, the pedal position sensor voltage may have a upwardly sloping relationship to the speed command. Additionally, if the pedal position sensor voltage is below a specified low value (i.e., within 5% of the low calibration voltage), a deadband may be provided where the speed command may be maintained at zero percent. Additionally, after the pedal position sensor voltage reaches a specified high value (i.e., within 5% of the high calibration voltage), the speed command may remain at 100%, with a deadband up to the high calibration voltage.

Figure 4:
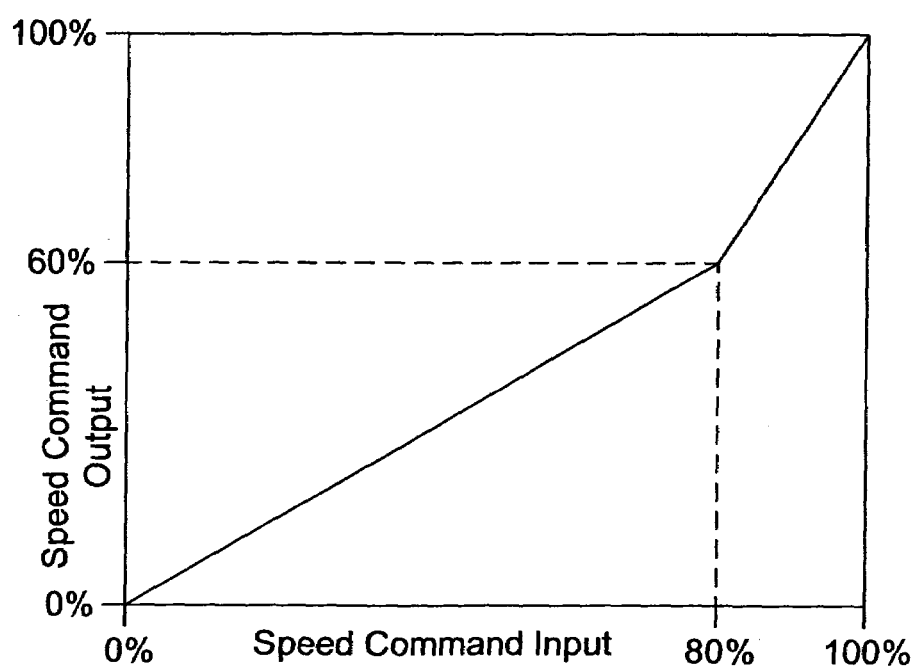
FIG. 4 is a graph of a relationship between the speed command input and speed command output in the first "automatic" mode according to a first embodiment.

In one embodiment, the speed command from the accelerator pedal position sensor may be subject to an optional profile modification step. Profile modification may be used to adjust performance of the transmission controls, or to provide finer control at lower speeds. FIG. 4 provides an example of profile modification of the speed command. In FIG. 4, speed command inputs that are between zero and 80% are converted to outputs of between zero and 60%. Speed command inputs of 80% to 100% are converted to outputs of 60% to 100%. This conversion may allow finer control at lower speeds.

Figure 5:
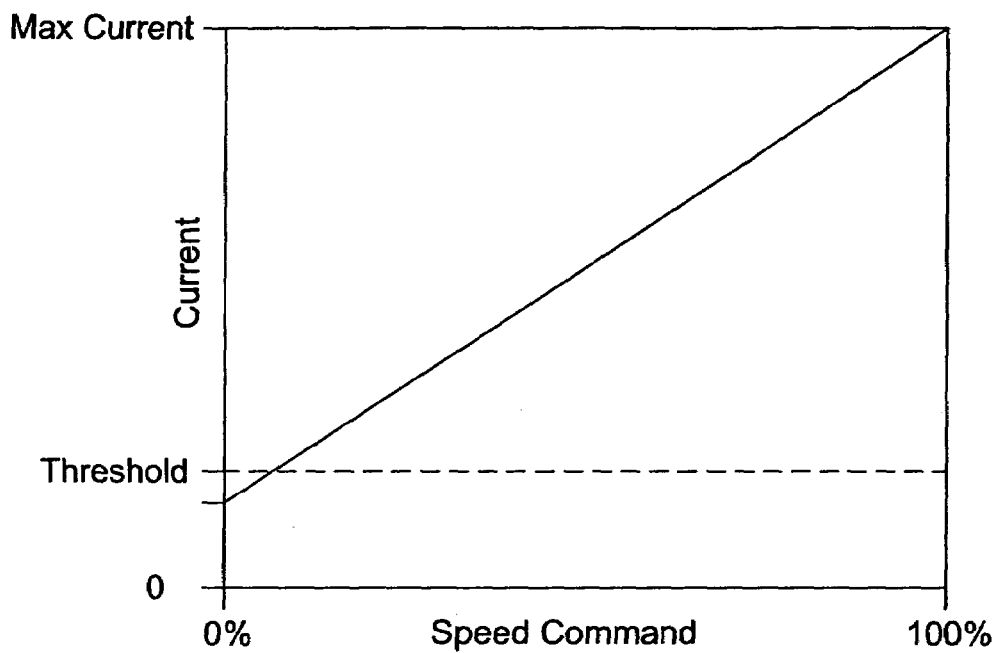
FIG. 5 is a graph of a relationship between the speed command and current in the first "automatic" mode according to a first embodiment.

In one embodiment, the speed command from the accelerator pedal position sensor may be converted to a current value. For example, as shown in FIG. 5, the relationship between the speed command and current value may have an upward linear slope. A threshold current value may be specified as the minimum current to the hydrostatic transmission that may be necessary for the tractor or vehicle to move. As the speed command exceeds zero percent, the speed command may be converted to a current value just under the threshold current value; e.g., about 80% to 90% of the threshold current value. As the speed command increases further, the current also may continue to increase at a specified slope.

In one embodiment, the microcontroller may include an algorithm that compares a throttle position input to an actual engine speed input. The throttle position input indicates a predicted engine speed. If the actual engine speed is less than the predicted engine speed, an adjustment can be made to an output to the proportional pressure reducing valve which controls the swashplate position in the hydrostatic pump. The swashplate adjustment can de-stroke the swashplate to reduce load from the engine and bring the actual engine speed back up to the predicted engine speed.

Figure 10:
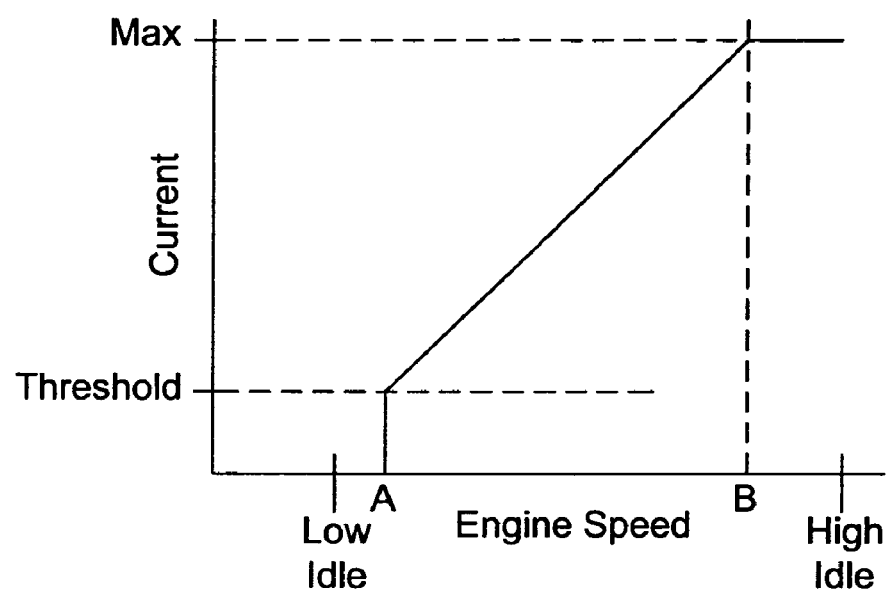
FIG. 10 is a graph of a relationship between the speed command and current in the first "automatic" mode according to a second embodiment.

In a second embodiment, if the transmission controls are operated in the first "automatic" mode, the speed command from the accelerator pedal position sensor may be converted to a current value as shown in FIG. 10. In the second embodiment, if the speed command is in a range from zero up until it reaches slightly above low idle (e.g., about 10% above low idle), current output may be set to zero. If the speed command is at least about 10% above low idle, the current value may be on an upward slope from a threshold current value (the minimum current necessary for the tractor to move), up to a maximum current value where engine speed is slightly below low idle (i.e., about 10% below high idle). If the speed command is higher (from about 10% under high idle up to high idle), the current value stays at the maximum.

In either the first or second embodiments, the microcontroller 102 may provide a current to proportional valve(s) 106 to provide a control pressure to a servo piston to control the hydrostatic motor swash plate angle. The speed of the hydrostatic motor may be increased or decreased as a result. For a given control pressure, the actual hydrostatic motor speed may depend on the load and/or pressure of the system.

As shown in FIG. 2, when operating the transmission controls in a "gear" mode, each angular position of the shift lever may provide a distinct analog voltage signal. For example, if the shift lever is at an angular position of about 0 degrees (plus or minus about 3 degrees), the shift lever sensor may provide an analog voltage signal of about 0.7 volts (or in a band between about 0.5 and about 0.9 volts). If the shifter is turned to an angular position of about 50 degrees (plus or minus about 3 degrees), the shift lever sensor voltage signal may be about 1.9 volts (or in a band between about 1.7 and about 2.1 volts). If the shifter is turned to an angular position of about 75 degrees (plus or minus about 3 degrees), the shift lever sensor voltage signal may be about 2.5 volts (or in a band between about 2.3 and about 2.7 volts). If the shifter is turned to an angular position of about 100 degrees (plus or minus about 3 degrees), the shift lever sensor voltage signal may be about 3.1 volts (or in a band between about 2.9 and about 3.3 volts). If the shifter is turned to an angular position of about 125 degrees (plus or minus about 3 degrees), the shift lever sensor voltage signal may be about 3.7 volts (or in a band between about 3.5 and about 3.9 volts). If the shifter is at an angular position of about 150 degrees (plus or minus about 3 degrees), the shift lever sensor voltage signal may be about 4.3 volts (or in a band between about 4.1 and about 4.5 volts).

Figure 6:
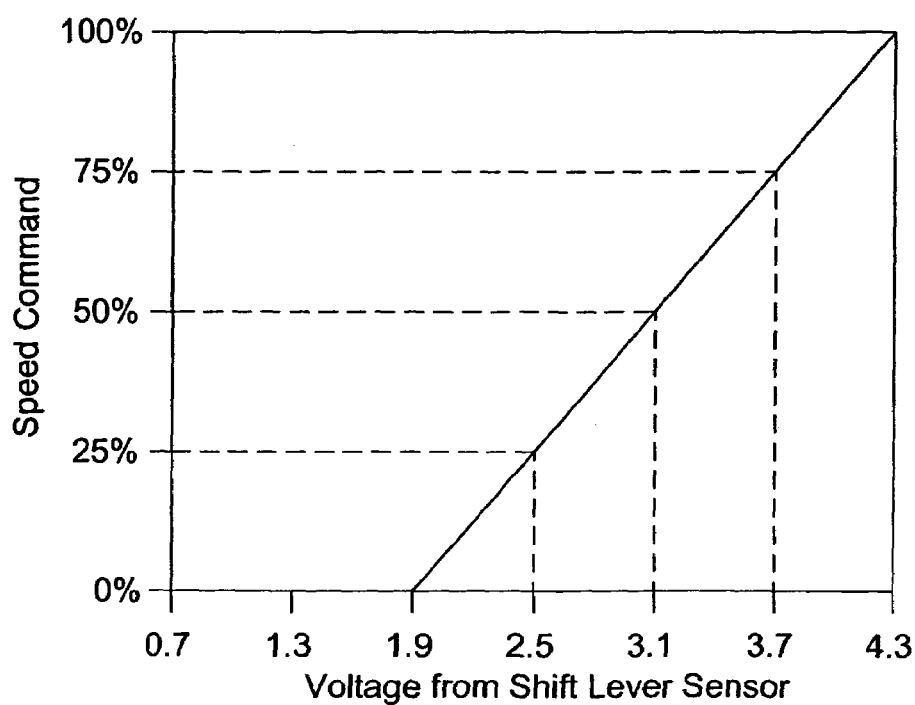
FIG. 6 is a graph of a relationship between voltage from the shift lever sensor and the speed command in the second "gear" mode according to a first embodiment.

In one embodiment of the transmission controls in a "gear" mode, the analog voltage signals from the shift lever sensor may be converted to desired speed commands between zero and 100%. FIG. 6 provides an example of how the shift lever sensor voltages may be converted to desired speed commands. For example, a shift lever sensor voltage of 1.9 volts may be recognized and converted to a speed command of zero percent to simulate operation of a transmission in neutral, or out of gear. Each value of the shift lever sensor voltage may be recognized and converted to a speed command up to a maximum of 100%. The relationship between shift lever sensor voltage and the speed command may be a linear slope, as shown in FIG. 6, or may have a modified profile if desired.

In one embodiment, the transmission controls optionally may include "clutch" pedal 105 to provide a modulator for either or both operational modes. The position of the "clutch" pedal may be sensed using any position sensor including a potentiometer, a hall effect sensor, or a pressure transducer. The sensor may produce an analog voltage signal that may be converted to a clutch pedal position command between zero and 100%. For example, if "clutch" pedal 105 is let all the way out (released) by the operator, the full or 100% command may be provided. As "clutch" pedal 105 is depressed, the clutch pedal command may be reduced proportionally to the amount of pedal travel. If "clutch" pedal 105 is fully depressed to the bottom of travel, the command may be reduced to zero to stop movement of the tractor or utility vehicle. Alternatively, the "clutch" pedal may increase the deceleration rate when the bottom of travel is reached. Optionally, the "clutch" pedal may need to be fully depressed to change between the two operational modes.

Figure 7:
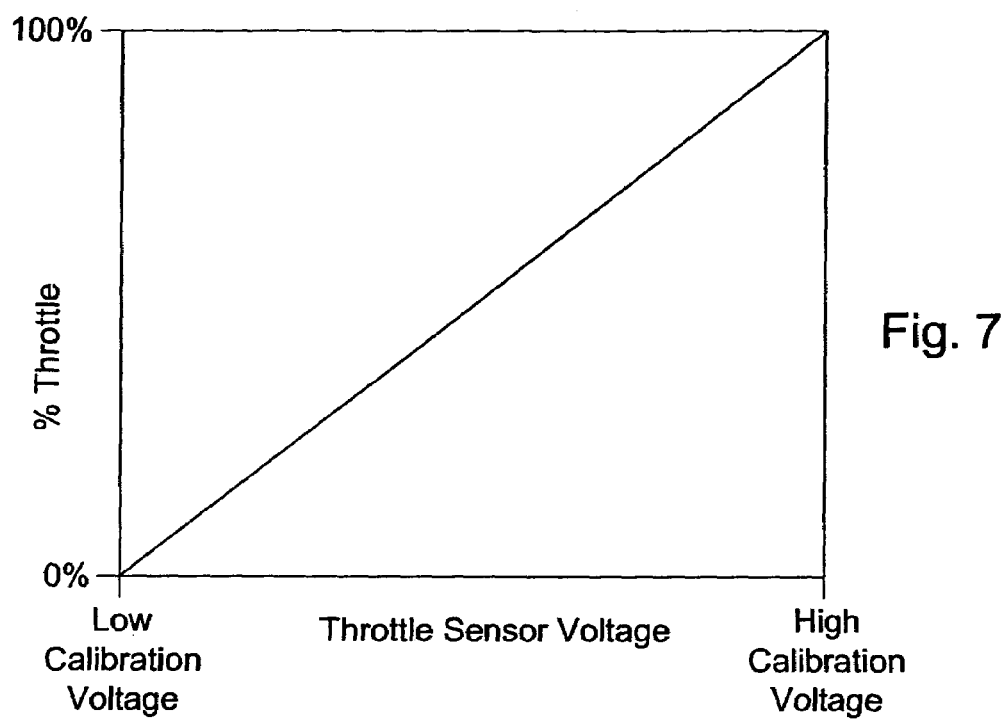
FIG. 7 is a graph of a relationship between throttle sensor voltage and percent throttle in the first "automatic" mode and/or the second "gear" mode according to a first embodiment.
Figure 8:
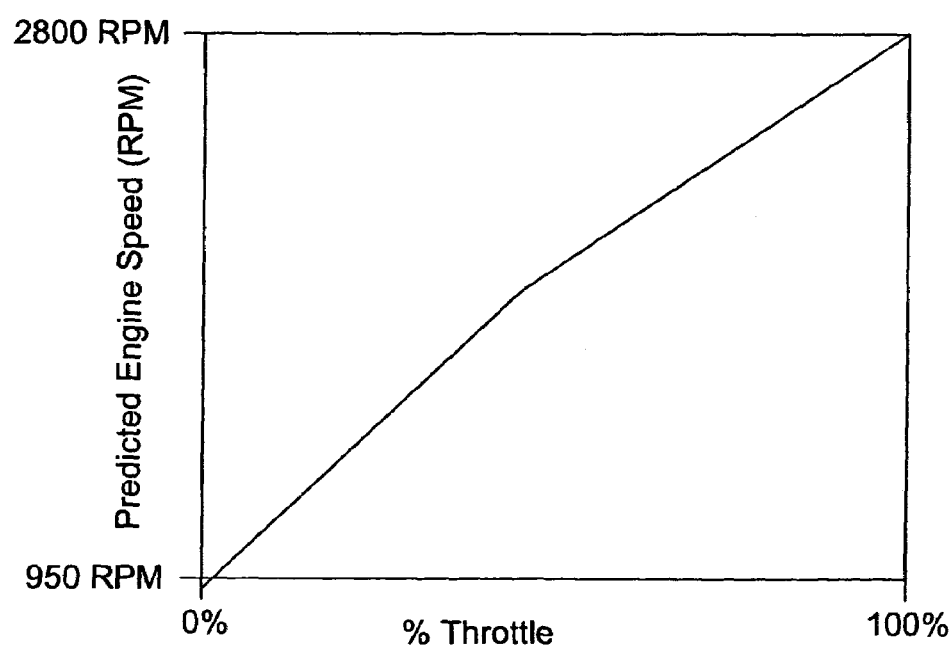
FIG. 8 is a graph of a relationship between percent throttle and predicted engine speed in the first "automatic" mode and/or the second "gear" mode according to a first embodiment.

In one embodiment, the transmission controls also may include a throttle position sensor. Throttle 112 may be used to control the speed of engine 100, and a throttle control position sensor also may provide a throttle sensor analog voltage signal to microcontroller 102. As shown in FIG. 7, the throttle sensor voltage may be converted to a throttle output percent, in a range between zero and 100%. Additionally, as shown in FIG. 8, percent throttle may be converted to a predicted engine speed output. If the throttle output percent is at zero, the predicted engine speed may be at a slow idle (e.g., about 950 rpm). If the throttle output percent is 100%, the predicted engine speed may be at its maximum (e.g., about 2800 rpm). The relationship between throttle output percent and predicted engine speed may be a linear slope or may depend on operating characteristics of the engine.

Figure 9:
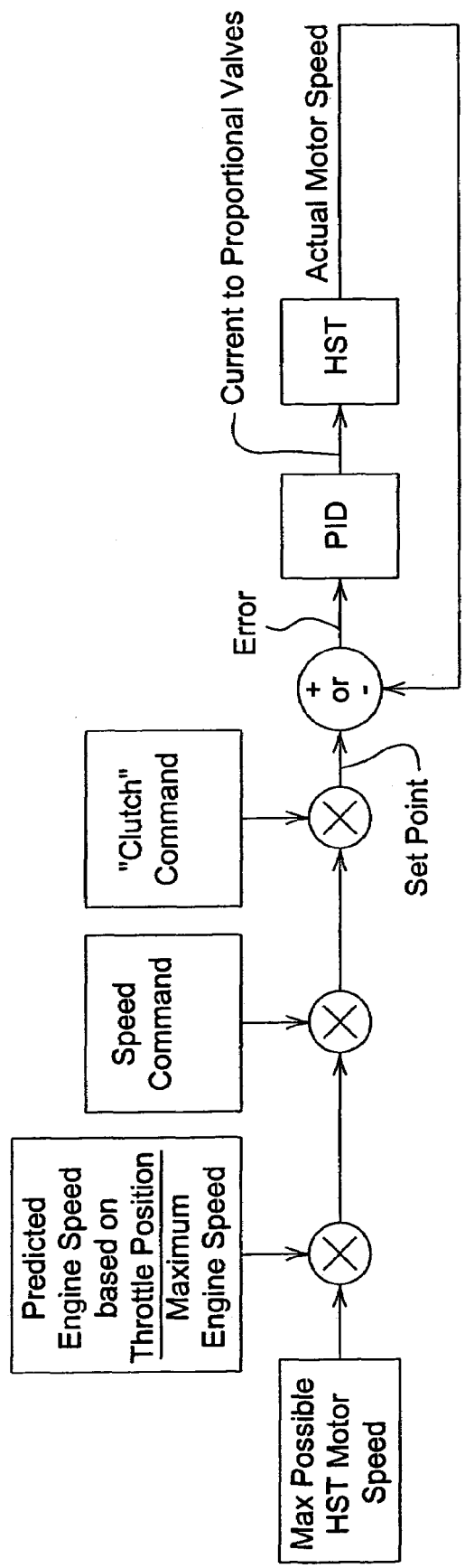
FIG. 9 is a schematic representation of a system to control a hydrostatic transmission in a the first "automatic" mode and/or the second "gear" mode according to a first embodiment.

In one embodiment, microcontroller 102 may process the transmission control commands to provide a set point for a hydrostatic motor speed percent command. As shown in FIG. 9, the transmission control commands may include the following:

Maximum possible HST motor speed. For example, the maximum possible HST motor speed may be a fixed value of about 2000 rpm for a typical HST motor.

Throttle position ratio. This is the ratio of predicted engine speed (based on throttle position) to maximum engine speed. For example, the ratio may be between zero and 100% depending on the sensed position of the throttle.

Speed command. In the first "automatic" mode, the speed command may be a continuous variable between zero and 100% depending on the "accelerator" pedal position. In the second "gear" mode, the speed command may be a stepped variable having a value for each "gear" selected by shift lever or switch 103. For example, the speed command may be 25% if the shifter is placed in a first position to simulate first gear, 50% if the shifter is in a second position to simulate second gear, 75% if the shifter is in a third position simulating third gear, and 100% if the shifter is in a fourth position simulating fourth gear.

"Clutch" command. This optional input may be a variable between zero and 100% based on the sensed "clutch" pedal position.

In one embodiment, the Maximum possible HST motor speed, Throttle position ratio, Speed command and optional "Clutch" command may be used to determine a set point for the desired HST motor speed. Each of these inputs may be multiplied together. For example, if Maximum possible HST motor speed is 2000 rpm, Throttle position ratio is 80%, Speed command is 75%, and "Clutch" command is 100%, the set point for desired HST motor speed will be 1200 rpm.

In one embodiment, microcontroller 102 may process the inputs schematically represented in FIG. 9 to determine a set point for actual HST motor speed. The set point then may be compared to sensed actual HST motor speed, and any difference or error between the set point and actual motor speed may be computed. The error may be processed by the microcontroller using a speed control algorithm or scheme to determine the amount of current to provide to proportional valves 106 that control the servo system 107 of hydrostatic transmission pump 108. For example, the control scheme may be a proportional integral and derivative (PID).

In one embodiment, the PID result may be converted to a current output. The current may be provided to proportional valve(s), which may provide control pressure to a servo piston to control a hydrostatic motor swash plate angle. For a given control pressure, the hydrostatic motor speed may depend on the load or pressure of the system.

In one embodiment, the tractor also may have several range gears 113 between the hydrostatic motor and the drive wheels. With three range gears, and four hydrostatic transmission step input speeds, twelve distinct speeds may be employed. Additionally, a range gear position/final drive speed sensor 114 may be provided.

Having described the preferred embodiment, it will become apparent that various modifications can be made without departing from the scope of the invention as defined in the accompanying claims.

The invention claimed is:

1. An apparatus comprising:
   a hydrostatic transmission on a tractor;
   a microcontroller providing speed commands to a hydrostatic transmission pump; and
   transmission controls providing signals to the microcontroller so the speed commands cause the hydrostatic transmission to operate in either a first mode or a second mode; in the first mode the speed commands are continuously variable based on the position of a foot pedal; and in the second mode the speed commands are any of a plurality of discrete values based on the position of a manually operable switch.

2. The apparatus of claim 1 wherein the manually operable switch is a rotary knob.

3. The apparatus of claim 1 wherein the foot pedal position is independent of engine speed.

4. The apparatus of claim 1 wherein the foot pedal position is sensed by a position sensor that provides an analog voltage signal to the microcontroller.

5. The apparatus of claim 1 wherein the microcontroller converts the foot pedal position to a speed command between zero and 100%.

6. The apparatus of claim 1 wherein the microcontroller has a deadband at at least one foot pedal position.

7. The apparatus of claim 1 further comprising a throttle position sensor that provides a voltage signal to the microcontroller.

8. A control apparatus for a tractor having an engine and a hydrostatic transmission having a pump, comprising a manual switch movable between a plurality of positions, each position causing a different voltage signal to a microcontroller, in at least one of the positions the microcontroller causes the microcontroller to operate in an automatic mode wherein the speed commands depend on the position of a foot pedal, and in at least two of the positions the hydrostatic transmission causes the hydrostatic transmission to operate in a gear mode wherein the speed commands depend only on the manual switch position.

9. The control apparatus of claim 8 wherein the manual switch may be moved to a plurality of discrete positions.

10. The control apparatus of claim 8 wherein the manual switch position is sensed by electrical switch contacts.

11. The control apparatus of claim 8 wherein the manual switch position is sensed by an analog electrical device.

12. The control apparatus of claim 8 further comprising a second foot pedal that modulates the voltage signals from the manual switch.

13. A method for operating a hydrostatic transmission pump comprising manually selecting a first operating mode or a second operating mode; the first operating mode providing a voltage signal to a microcontroller providing a speed command to the hydrostatic transmission pump based on the position of a pedal between an extended position and a depressed position; the second operating mode providing a voltage signal to the microcontroller providing a speed command to the hydrostatic transmission pump based on a selected switch position from a plurality of different switch positions.

14. The method of claim 13 further comprising reducing the speed command from the pedal position sensor if the pedal is at or adjacent the extended position.

15. The method of claim 13 further comprising converting the speed commands to current values.

16. The method of claim 13 further comprising reducing the speed command from the pedal position sensor if a second pedal is depressed.

17. The method of claim 13 wherein the position of the pedal is independent of the speed of an engine to which the hydrostatic transmission pump is operably connected.

18. The method of claim 13 further comprising sensing the actual speed of the hydrostatic transmission pump and computing any difference between the speed commands and the sensed actual speed of the hydrostatic transmission pump.

19. The method of claim 13 further comprising converting the speed commands to a current output.

20. The method of claim 13 further comprising sensing predicted engine speed based on a throttle position, and de-stroking the hydrostatic transmission pump if actual engine speed is less than predicted engine speed.

* * * * *